United States Patent [19]

Maffey

[11] Patent Number: 4,697,444
[45] Date of Patent: Oct. 6, 1987

[54] SECURITY DEVICE FOR TRAILER

[76] Inventor: Constant O. Maffey, 34 Birchfield Ave., Cranford, N.J. 07016

[21] Appl. No.: 805,122

[22] Filed: Dec. 4, 1985

[51] Int. Cl.⁴ ............................................... F16B 41/00
[52] U.S. Cl. ........................................ 70/232; 70/361; 70/371; 70/389; 70/454
[58] Field of Search ................ 70/360, 232, 361, 389, 70/371, 229, 386, 231, 370, 417, 454, 447, 450; 280/507, 514, 432, 423 R

[56] References Cited

U.S. PATENT DOCUMENTS

| | | | |
|---|---|---|---|
| 832,106 | 10/1906 | Werner | 70/389 |
| 2,487,493 | 11/1949 | Swanson | 70/360 |
| 2,554,306 | 5/1951 | Mack. | |
| 2,641,124 | 6/1953 | Gallagher et al. | |
| 2,755,655 | 7/1956 | Maffey. | |
| 3,345,838 | 10/1967 | Russell et al. | 70/360 |
| 3,415,085 | 12/1968 | Eble, Jr. | |
| 3,431,754 | 3/1969 | Brumelle | 70/371 |
| 3,473,356 | 10/1969 | Niilola | 70/360 |
| 3,505,842 | 4/1970 | Taylor | 70/360 X |
| 3,782,146 | 1/1974 | Franke. | |
| 3,795,123 | 3/1974 | Stiffel. | |
| 3,798,938 | 3/1974 | McCullum. | |
| 4,031,727 | 6/1977 | DeGroat et al. | |
| 4,269,048 | 5/1981 | McDorman. | |
| 4,317,345 | 3/1982 | Hinson | 70/371 X |
| 4,347,720 | 9/1982 | Kenyon | 70/14 |
| 4,512,165 | 4/1985 | Uyeda | 70/417 X |
| 4,553,415 | 11/1985 | Maffey | 70/232 |

FOREIGN PATENT DOCUMENTS

| | | |
|---|---|---|
| 689737 | 6/1964 | Canada. |
| 2614645 | 6/1977 | Fed. Rep. of Germany ........ 70/360 |
| 579403 | 8/1924 | France ................................... 70/360 |

Primary Examiner—Robert L. Wolfe
Assistant Examiner—Lloyd A. Gall
Attorney, Agent, or Firm—Amster, Rothstein & Ebenstein

[57] ABSTRACT

A security device is disclosed which mounts to a king pin of a trailer to prevent unauthorized coupling of the trailer to a tractor. The security device includes a locking device which functions as a deadbolt. Within the locking device are contained a key actuated lock cylinder, a cam actuator and bearing balls which are moved by the actuator to lock the locking device in place and thereby lock the security device to the king pin. The exterior end of the locking device has a small 90° opening through which the key for the locking cylinder is inserted and which permits limited rotation of the key for locking and unlocking the lock cylinder while preventing withdrawal of the key except when the lock cylinder is locked. This provides a positive indication as to whether the locking device is locked or not. The locking device includes structure which permits the lock cylinder to be removed only when the security device is not mounted to a king pin, so that the lock cylinder cannot be removed from the security device by unauthorized personnel when the security device is mounted to a king pin. The locking device also includes structure which permits any one of a number of existing standard lock cylinders to be used.

22 Claims, 9 Drawing Figures

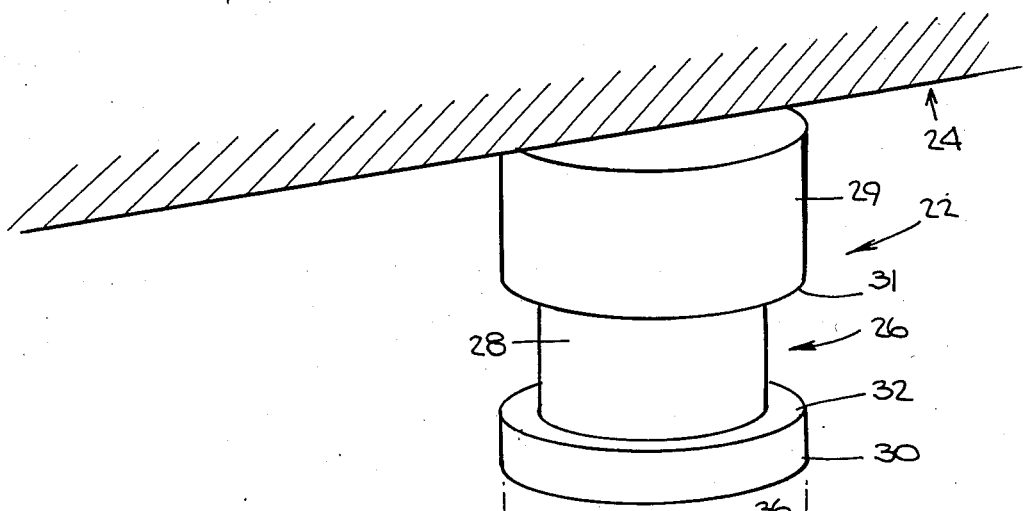
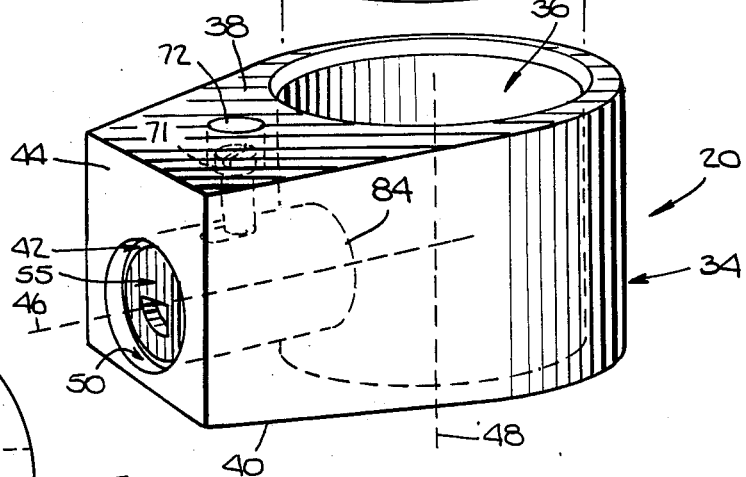
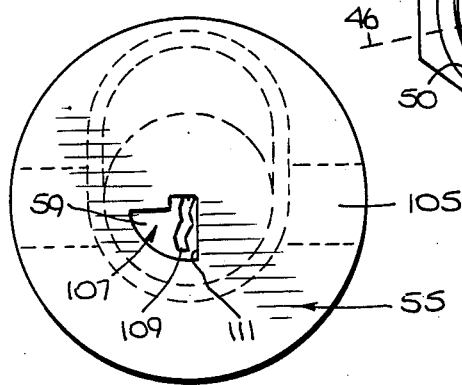
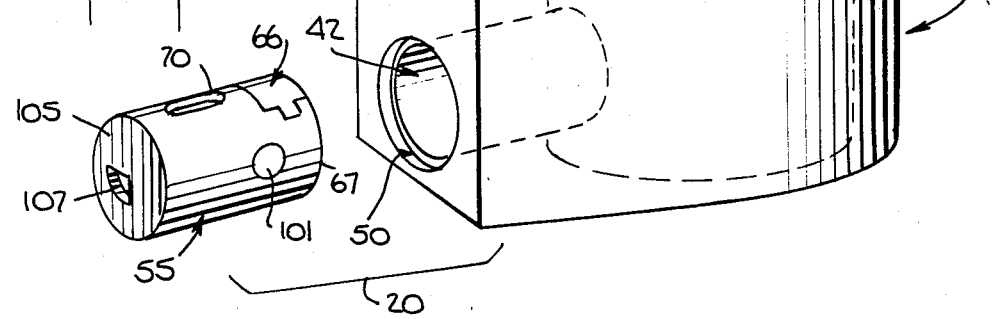

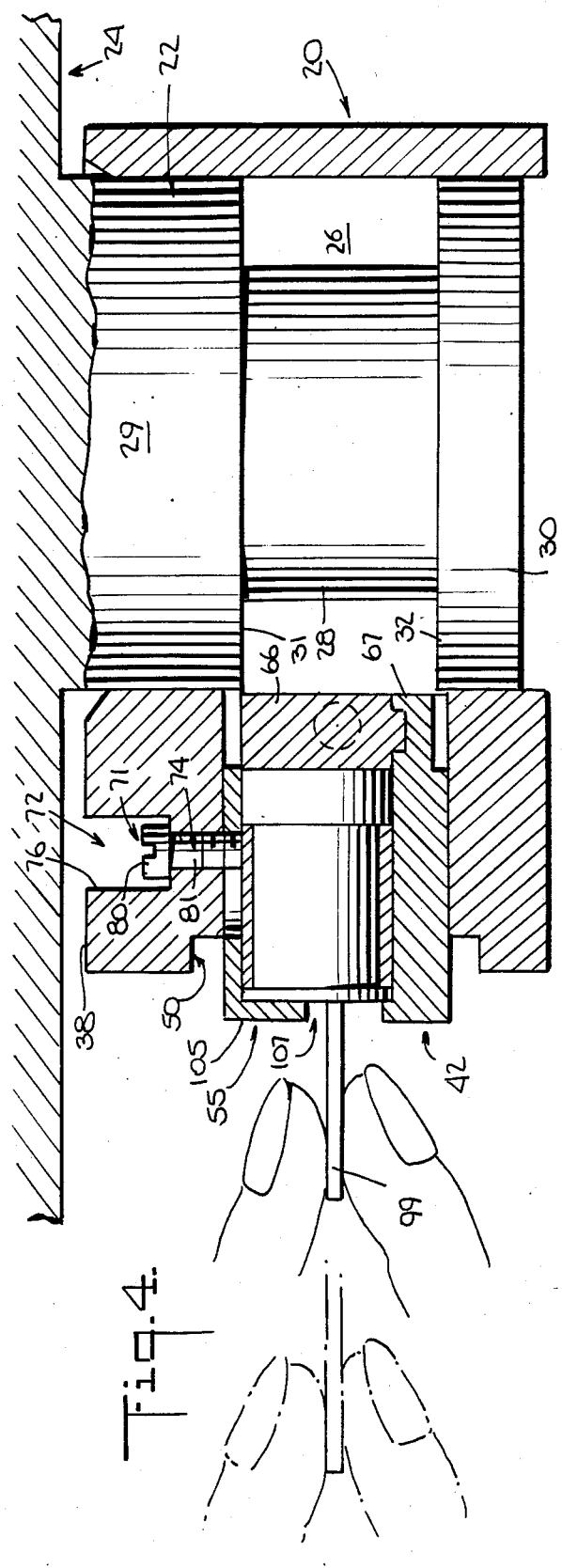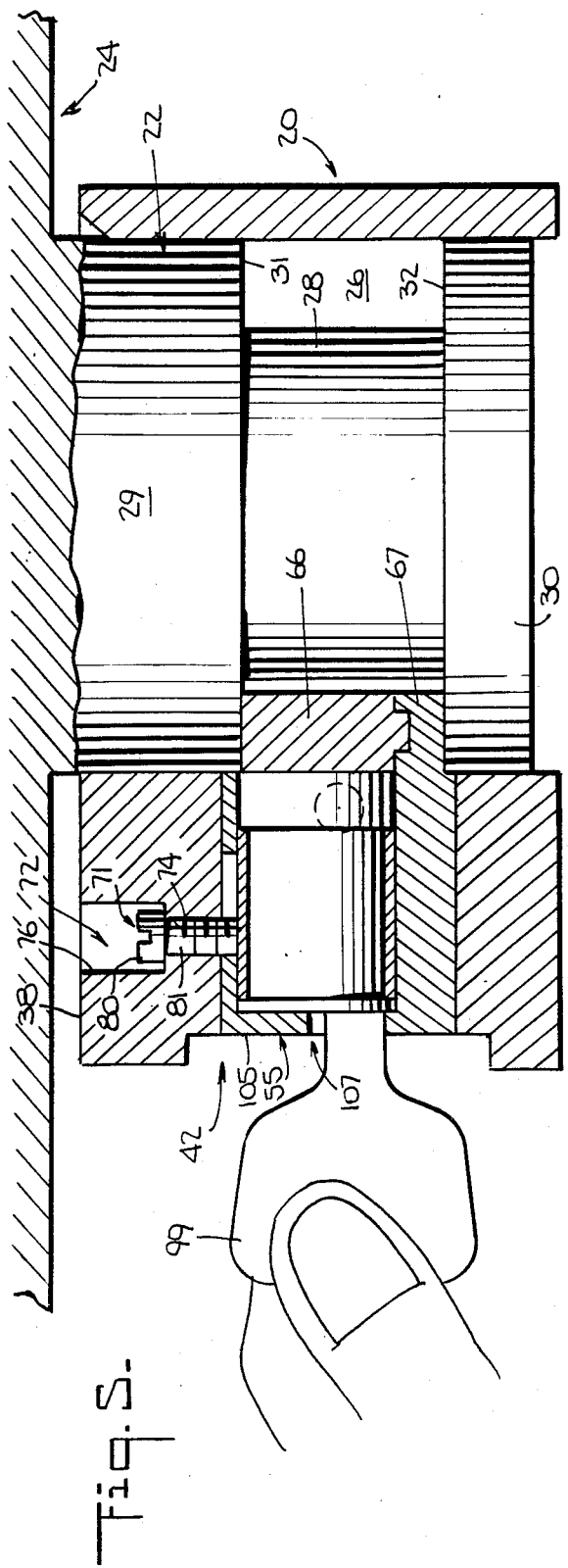

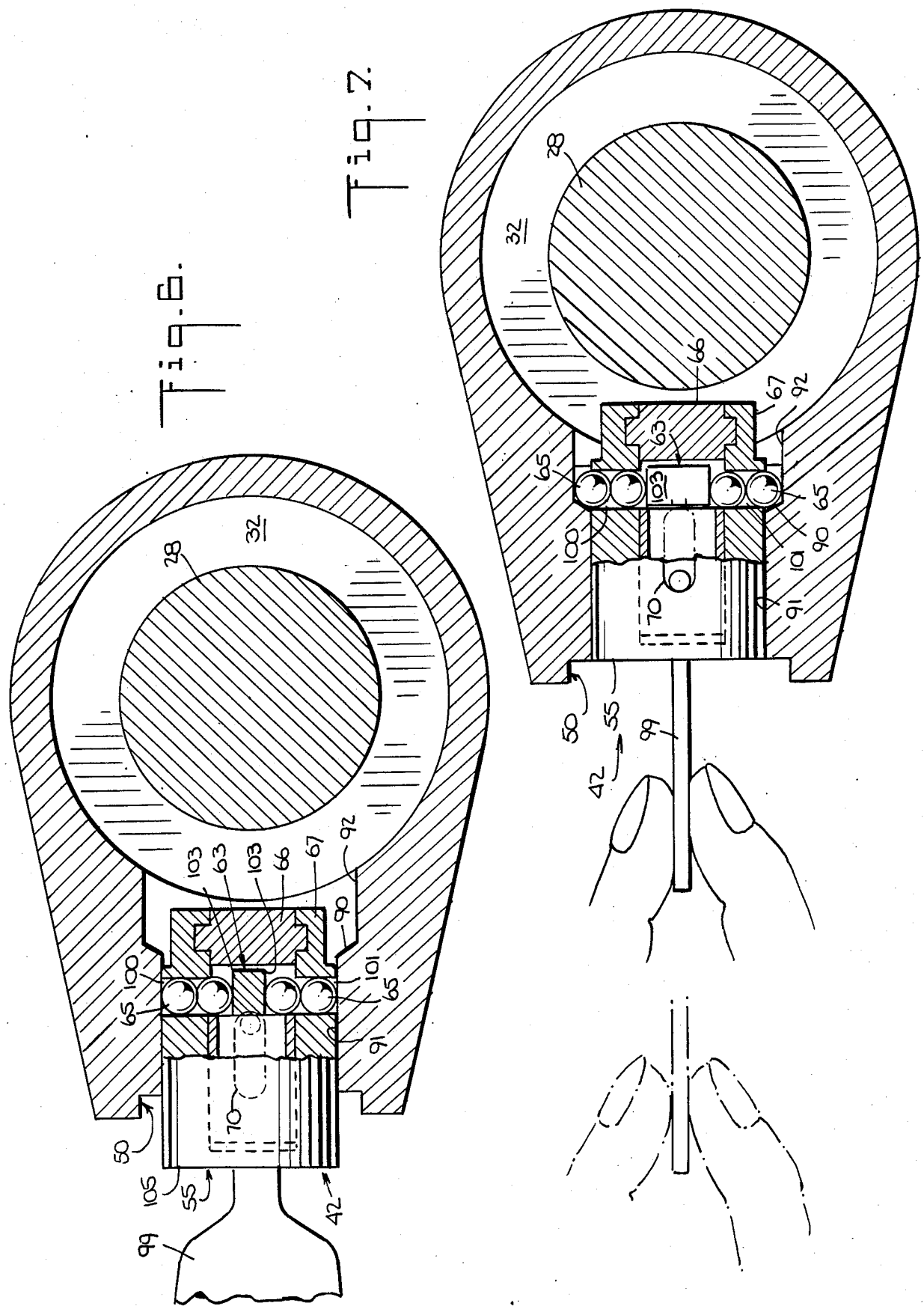

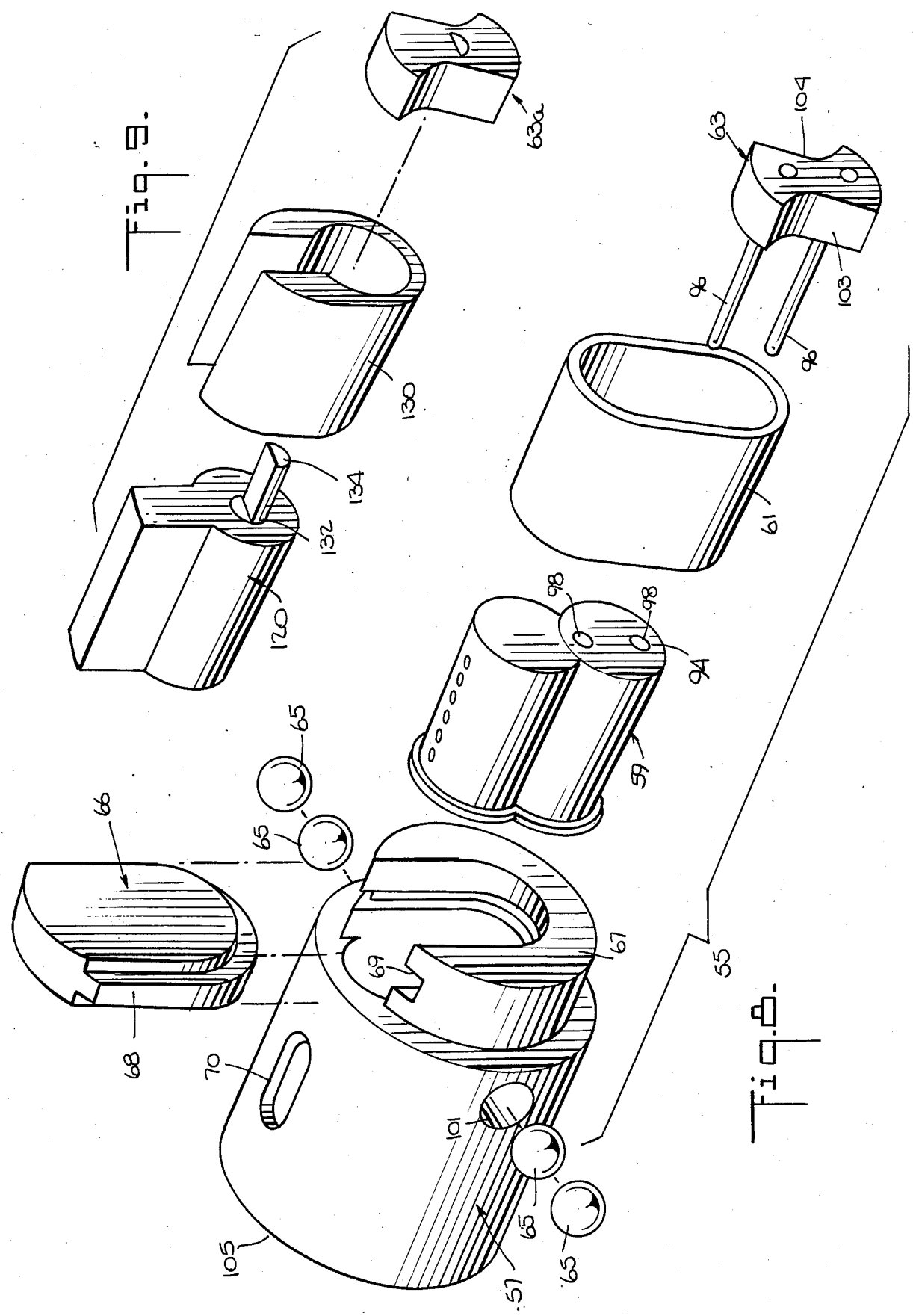

SECURITY DEVICE FOR TRAILER

BACKGROUND OF THE INVENTION

The present invention relates to a security device for preventing unauthorized use of a trailer or other vehicle having a coupling pin used to couple the trailer to a tractor or another vehicle, and to a locking device for the security device.

Coupling devices for coupling a trailer to a tractor typically include a coupling pin attached to the front of the trailer and a complementary receptacle attached to the rear of the tractor which releasably engages the trailer coupling pin while allowing relative pivoting of the trailer and tractor. A coupling device in wide use today comprises a pin referred to as a king pin depending from the front of trailers and a complementary skid plate receptacle or fifth wheel mounted to the rear of tractors. The king pin and skid plate are standardized so that any trailer having a king pin may be coupled to any tractor having a complementary skid plate. Frequently, trailers are uncoupled from tractors, for example, during loading and unloading, for storing trailers when they are not in use, or for using tractors independently of trailers, and left unattended. In such instances, an unauthorized person with a tractor having a complementary skid plate for the trailer king pin may simply couple to the trailer, connect the air hoses to release the trailer brakes and haul the trailer away.

To prevent unauthorized use of trailers having a coupling pin, security devices are known which are secured to the trailer coupling pin so as to prevent coupling of the trailer coupling pin to a complementary receptacle on a tractor. Such security devices include a locking device by means of which the security device is locked to the trailer coupling pin. Security devices of that type are described in U.S. Pat. Nos. 2,554,306 (Mack) issued May 22, 1951; 2,641,124 (Gallagher et al.) issued June 9, 1953; 2,755,655 (Maffey, the applicant herein) issued July 24, 1956; 3,415,085 (Eble, Jr.) issued Dec. 10, 1968; 3,798,938 (McCullum) issued Mar. 26, 1974, and 4,031,727 (DeGroat et al.) issued June 28, 1977; and Canadian Patent No. 689,737 (Dalton) issued June 30, 1964.

Prior security devices of the type described in the aforementioned patents were not entirely satisfactory for a number of reasons. In many prior security devices of that type, the lock cylinder, i.e., that part of the locking device which receives a key and is actuable between locked and unlocked conditions thereof, is exposed so that it could be easily tampered with. Thus, the lock cylinder could be engaged, for example, by drilling into it and connecting a pulling device to it, and forcibly retracted from the security device. U.S. Pat. No. 3,798,938 (McCullum) discloses a security device including a guard plate inserted across an opening for inserting the lock cylinder into the security device. The guard plate carrys a rotatable key-slotted disk in an opening coaxial with the key plug of the lock cylinder, which protects the key plug from drilling.

Some prior security devices of the general type described above include a locking device having a spring loaded bolt mechanism. See, for example, U.S. Pat. Nos. 3,415,085, 3,798,938 and Canadian Patent No. 689,737. It was thus possible to lock such a security device to a trailer coupling pin without the use of a key, which may have or may become lost or misplaced.

It is also possible for security devices of the general type described above to be attached to the trailer coupling pin but not positively locked thereto, while the security device externally appears to be locked to the trailer couping pin. Thus, it was possible for a trailer to be left unattended with a security device held by, but not locked to, the trailer coupling pin.

Applicant's prior U.S. Pat. No. 2,755,655 discloses a security device having a locking device slidably held in an aperature in the security device, the locking device being slidably movable into engagement with the trailer coupling pin for locking the security device to the coupling pin, and slidably movable out of engagement with the coupling for enabling removal of the security device from the coupling pin. That locking device included a lock cylinder which was almost fully exposed, and which was therefore accessible for tampering.

There is thus a need for a security device for vehicles such as trailers having a coupling pin which avoids the drawbacks described above, provides improved security and is of simple construction.

OBJECTS AND SUMMARY OF THE INVENTION

It is an object of the present invention to provide an improved security device for preventing unauthorized use of a trailer or other vehicle.

It is another object of the present invention to provide an improved security device of simple construction lockable to the coupling pin of a vehicle such as a trailer for preventing unauthorized use of the vehicle.

It is another object of the present invention to provide a security device which is lockable to the coupling pin of a vehicle such as a trailer for preventing unauthorized use of the vehicle and which cannot be locked to the vehicle without a key.

It is another object of the present invention to provide a security device which is lockable to the coupling pin of a vehicle such as a trailer for preventing unauthorized use of the vehicle and which positively indicates whether the device is locked to the coupling pin or not.

It is another object of the present invention to provide a security device which is lockable to the coupling pin of a vehicle such as a trailer for preventing unauthorized use of the vehicle and which accepts standard lock cylinders.

It is another object of the present invention to provide improved components for a security device of the type described in any of the foregoing objects of the invention.

The invention in achieving the above and other objects provides a security device which is lockable to a coupling pin for preventing unauthorized use of a vehicle having the coupling pin attached thereto and which includes structure providing limited access to the lock cylinder of the security device for inserting a key therein while protecting against tampering with the lock cylinder. According to the invention, the structure providing limited access to the lock cylinder prevents withdrawal of the lock cylinder from the security device. This and/or associated structure may also prevent removal of the key from the lock cylinder except when the lock cylinder is in its locked condition, thereby providing a positive, visually detectable way to determine if the security device is locked to the trailer or simply secured thereto. The security device also includes a deadbolt-type mechanism so that it can not be locked to a coupling pin without a key.

A security device according to the invention comprises a body having an open cavity, e.g., a generally cylindrical bore or hole, configured to receive the coupling pin, a first hole, e.g., a generally cylindrical bore, in the body communicating with the cavity and with the exterior of the body, and a locking device slidably disposed in the first hole which provides a deadbolt locking action. The locking device comprises an enclosure, e.g., a generally cylindrical enclosure, defining a cavity therein which receives a key actuable lock cylinder having a locked condition and an unlocked condition. The enclosure or means attached thereto or forming part thereof engages a coupling pin disposed in the cavity when the lock cylinder is in its locked condition.

Means are provided to selectively prevent removal of the lock cylinder from the enclosure. In one embodiment, such means are defined by an opening to the enclosure, the enclosure having a first opening thereto at one end which faces the exterior of the body and a second opening at an opposite end which faces the body cavity. In a preferred embodiment, the lock cylinder and the first and second openings to the enclosure cavity are sized and configured so that the lock cylinder is selectively removable from the enclosure only through its second opening. The enclosure may include a removable closure for its second end and means cooperating with the removable closure for receiving it to close the enclosure second end and prevent removal of the lock cylinder therefrom, the receiving means being located and the closure being configured so that the closure may be removed only in the unlocked condition of the lock cylinder when the coupling pin is not disposed in the cavity. The lock cylinder has an entrance at an end thereof facing the exterior of the body aligned with the first opening to the enclosure for receiving a key by means of which the lock cylinder is actuable to its locked and unlocked conditions.

The security device also includes means for selectively preventing removal of the locking device enclosure from the first hole, and means actuable by the lock cylinder for engagement between the locking device and the body to prevent movement between the enclosure and the body in the locked condition of the lock cylinder and permitting movement between the enclosure and the body in the unlocked condition of the lock cylinder. The means actuable by the lock cylinder may comprise first means coupled to the lock cylinder for movement between locking and unlocking positions thereof respectively corresponding to the locked and unlocked conditions of the lock cylinder in response to actuation of the lock cylinder to its locked and unlocked conditions, and second means coupled to the first means for causing engagement between the locking device and the body in the locking position of the first means, the enclosure being slidably mounted in the first hole of the body for movement between locking and unlocking positions thereof. The enclosure in its locking position engages the coupling pin disposed in the cavity and is locked thereat when the lock cylinder is in its locked condition. The enclosure is movable to its unlocking position in which the body may be separated from the coupling pin when the lock cylinder is in its unlocked condition.

In a specific embodiment, the means actuable by the lock cylinder includes at least one hole in the enclosure and the first means comprises at least one bearing ball disposed to be moved in the hole to substantially project from the enclosure in the locking position of the enclosure when the lock cylinder is in its locked condition, and to be substantially within the enclosure in the unlocking position of the enclosure. The first hole in the body includes a shoulder which engages the bearing ball when it substantially projects from the enclosure whereby the enclosure is prevented from moving in the first hole in the body to lock the security device to the coupling pin. However, when the bearing ball is substantially within the enclosure, the enclosure is permitted to be moved in the first hole in the body to its unlocking position whereby the security device may be separated from the coupling pin. The enclosure, the lock cylinder, the structure actuable by the lock cylinder and the enclosure structrue thereby cooperate to provide a deadbolt locking action.

The first opening to the locking device enclosure may be configured so as to permit limited rotation of a key inserted therethrough into the lock cylinder, and the lock cylinder is constructed so as to be actuated to its locked and unlocked conditions by the limited rotation of the key. The lock cylinder may be further constructed so as to prevent withdrawal of the key therefrom in the unlocked condition thereof within the limited rotation permitted for the key. In a specific embodiment, the first opening to the enclosure is configured to permit rotation of a key inserted therein approximately 90° which, when used with a standard lock cylinder properly positioned relative to the opening, permits withdrawal of the key only in the locked condition of the lock.

The means preventing removal of the enclosure from the hole in the body may comprise a second hole in the body communicating with the first hole and a fastener disposed in the second hole extending in the first hole, the fastener being movable into and out of engagement with the enclosure. A hollow sleeve having an inner configuration for receiving a standard lock cylinder may be removably disposed in the enclosure cavity, and the enclosure configured so that the sleeve is received therein and fixed against rotation relative thereto.

The above and other objects, aspects, features and advantages of the invention will be more readily perceived from the following description of the preferred embodiments of the invention taken with the accompanying drawings and appended claims.

BRIEF DESCRIPTION OF THE DRAWINGS

The present invention is illustrated by way of example and not limitation in the figures of the accompanying drawings in which like numbers indicate like parts and in which:

FIG. 1 is an exploded perspective view of a security device according to the invention and a trailer king pin illustrating mounting of the security device to the king pin;

FIG. 2 is an exploded perspective view of the security device depicted in FIG. 1 showing the locking device of the security device separated from the body of the security device;

FIG. 3 is a front elevation view of the locking device of the security device of FIG. 1;

FIG. 4 is a vertical cross-sectional view of the security device of FIG. 1 depicted attached to the trailer king pin in an unlocked condition of the security device;

FIG. 5 is a vertical cross-sectional view similar to that of FIG. 4 depicting the security device attached to the trailer king pin in a locked condition of the security device;

FIG. 6 is a horizontal cross-sectional view of the security device of FIG. 1 depicted mounted to the trailer king pin in the unlocked condition of the security device;

FIG. 7 is a horizontal cross-sectional view similar to that of FIG. 6 depicting the security device mounted to the trailer king pin in the locked condition of the security device;

FIG. 8 is an exploded perspective view of the locking device of the security device of FIG. 1 illustating one embodiment of a lock cylinder therefor; and FIG. 9 is an exploded perspective view of an alternate embodiment of a lock cylinder for the locking device depicted in FIG. 8.

DESCRIPTION OF THE PREFERRED EMBODIMENTS

Referring now to the drawings, FIG. 1 depicts the security device 20 according to the invention in position to be mounted to the king pin 22 depending from the bottom of a trailer 24. The king pin 22 is conventional and is cylindrically configured having an angular recess 26 formed by a reduced diameter portion 28 and adjacent full diameter portions 29 and 30. The king pin 22 thus has upper 31 and lower 32 shoulders defined by the recess 26.

The security device 20 includes a body 34 having a cylindrical cavity or hole 36 extending into the body from a top 38 of the body. The cavity 36 may be a blind hole, i.e., closed at the bottom 40 of the security device body 34 or a through hole opening to the bottom 40 of the body 34. The embodiment of the body 34 depicted in FIGS. 1-7 includes a cavity 36 in the form of a through hole. The particular overall shape of the body 34 is not critical but is such that when the body 34 is mounted to the king pin 22, the king pin with the body 34 cannot be coupled to a complementary skid plate of a tractor.

The body 34 of the security device 20 includes a first hole or bore 42 extending through the body from a side 44 thereof to the cavity 36. As shown, the axis 46 of the hole 42 extends generally perpendicular to the axis 48 of the cavity 36. However, the axis 46 of the hole 42 may be inclined with respect to the axis 48, if desired, noting that the exterior opening 50 to the hole 42 should be reasonably accessible when the body 34 is mounted to the king pin 22.

Inserted into the hole 42 is a locking device 55 (see FIG. 8) which comprises an enclosure 57 having a cavity containing a key-activated lock cylinder 59 (also referred to as a lock core), a sleeve 61 for the lock cylinder 59, a cam member 63 coupled to the lock cylinder 59 and actuated thereby, and hardened steel bearing balls 65 contacted by the cam member 63 and movable thereby. A removable end closure 66 is provided to close off end 67 of the enclosure 57 and includes a peripheral flange 68 received in a mating recess 69 in the end 67 of the enclosure 57. The enclosure 57 acts as a locking bar or deadbolt, as described below, and is referred to below as "the locking bar".

The entire locking device 55 is mounted in hole 42 for slidable movement therein between a locking position in which the end 67 of the locking bar 57 projects substantially into the cavity 36 and an unlocking position in which the locking bar 57 does not project substantially or at all into the cavity 36. In the locking position of the locking device 55, which is depicted in FIG. 5, the end 67 of the locking bar 57 projects into the recess 26 of the king pin 22 and is engagable by the shoulders 31 and 32 of the king pin to prevent relative movement of the security device 20 and the king pin 22 axially of the king pin. The outer diameter of the end 67 of the locking bar 57 is sized to fit into the recess 26 with limited clearance (not shown) so that the end 67 will be engaged by the shoulders 31 and/or 32 upon attempted removal of the security device 20 from the king pin 22 when the locking device 55 is in its locking position. In the unlocking position of the locking device 55, shown in FIG. 4, the locking bar 57 is retracted into the hole 42 clear of the shoulders 31 and 32 of the king pin 22 so that the security device 20 and the king pin 22 may be moved relative to each other axially of the king pin.

Means are provided to prevent removal of the locking device 55 from hole 42 through the exterior opening 50 while permitting slidable movement of the locking device between its locking and unlocking positions, comprising an axially extending slot 70 in the circumference of the locking bar 57 engaged by a threaded screw 71 which extends through a second hole 72 in the security device body 34 which opens into the first hole 42 and is positioned to register with the slot 70 in both the locking and unlocking positions of the locking device 55. As shown in FIGS. 4-5, the hole 72 includes a threaded reduced diameter portion 74 which opens into the hole 42 and an increased diameter portion 76 which opens to the top 38 of the body. The threaded screw 71 which has a screw head 80 and a threaded shaft 81 is received in the slotted opening 70 of the locking bar 57 to retain the locking device 55 in the hole 42. The screw 71 is inserted into the hole 72 and threaded to the threaded portion 74 thereof until the head 80 of the screw seats on the shoulder formed by the reduced diameter portion 74 of the hole 72, with the screw threaded shaft 81 projecting into the slotted opening 70. The axial length of the slotted opening 70 is slightly longer than the radial depth of the angular recess 26 of the king pin 22 so that the locking device 55 may be moved axially between the locking and unlocking positions thereof.

The first hole 42 includes the enlarged opening 50 to the exterior of the body and interior opening 84 to the cavity 36, both of which are sized to permit removal of the locking device 55 from the body 34. However, if desired, the exterior opening 50 may have a reduced diameter smaller than the diameter of the locking bar 57 so that the locking bar cannot be removed from the body 34 from the exterior thereof but only through the interior opening 84. The radial depth of the slot 70 is substantial and the size of the screw 71 particularly its threaded shaft 81 is also substantial so as to require exceptional force to shear the threaded shaft 81 of the screw and withdraw the locking device through the exterior opening 50 of the body. Thus, it would be practically impossible to remove the locking device 55 from the body 34 when the security device 20 is mounted to the king pin 22.

Referring now to FIG. 8, the means actuable by the lock cylinder for causing engagement between the locking bar 57 and the body 34 in the locking position of the locking device 55 comprises the cam actuator 63, the bearing balls 65, the holes 100,101 in the locking bar 57, and a shoulder 90 (FIGS. 6 and 7) formed in the first hole 42 by a reduced diameter portion 91 and an increased diameter portion 92. With the locking device fully assembled and mounted in the first hole 42 as depicted in FIGS. 6 and 7, the sleeve 61 surrounds the lock cylinder 59 and accomodates the lock cylinder 59 to the interior shape of the locking bar 57. The first means coupled to the lock cylinder comprises cam actuator 63 coupled to the rotatable plug portion 94 of the lock cylinder 59 by a pair of prongs 96 connected to the cam actuator 63 and a corresponding pair of holes 98 in the rotatable plug portion 94 of the cylinder 59. The second means comprises the bearing balls 65. As is conventional, the cylinder plug portion 94 rotates upon actuation of the lock cylinder 59 by a key 99, which correspondingly causes rotation of the cam actuator 63 between locking and unlocking positions. The cam actuator 63 projects from the sleeve 61 adjacent a pair of opposed holes 100, 101 (FIGS. 6 and 7) in the locking bar 57. In the unlocking position of the cam actuator 63 depicted in FIG. 6 with the recessed camming surfaces 103,104 of the cam actuator 63 opposite the holes 100,101 in the locking bar 57, at least one of the bearing balls 65 extends into each of the holes 100,101 but does not project substantially therefrom. Thus, the bearing balls 65 do not extend into interference with the inner surface of the reduced diameter portion 91 of the first hole 42. The outer bearing balls may, however, project slightly from the holes 100,101 to contact the inner surface of the reduced diameter portion 91 to reduce friction between the locking bar 57 and the first hole 42 and thereby enhance sliding movement of the locking bar 57 in the hole 42.

As mentioned above, in the unlocking position of the locking device 55 depicted in FIG. 6, the end 67 of the locking bar 57 does not project substantially or at all into the cavity 36. Upon rotation of the key 99 in the lock cylinder 59, which causes rotation of the rotatable cylinder plug 94 of the lock cylinder and with it the camming actuator 63 to its locking position, the bearing balls 65 are forced radially outwardly of the locking bar 57 through the holes 100,101, and upon the application of an inward axial force to the locking bar 57 to push it inwardly, the bearing balls 65 project into the increased diameter portion 92 of the hole 42 when the locking bar end 67 projects into the recess 26 of the king pin 22. The locking bar 57 is prevented from moving further into the cavity 36 by engagement of the screw 71 with the slot 70, and/or contacting of the locking bar end 67 with the reduced diameter portion 28 of the king pin 22. At this point, the bearing balls 65 project from the holes 100,101 into engagement with the shoulder 90 in the hole 42. When th locking cylinder 59 is locked in this condition, the bearing balls 65 are locked in the position depicted in FIG. 7 engaging the shoulder 90 so that the locking bar 57 cannot be retracted from the recess 26 of the king pin 22 into the hole 42. Thus, the security device 20 is locked to the king pin 22.

Referring now to FIG. 3, the end 105 of the locking bar 57 is closed except for a wedge-shaped opening 107 extending for slightly less than 90° which is positioned to register with the key entrance 109 of the lock cylinder 59. The lock cylinder 59 is positioned so that the key entrance 109 thereto is adjacent one edge 111 of the opening 107 in the locked condition of the lock cylinder. In this relative position of the lock cylinder 59 and the opening 107, the key 99 may be freely inserted and removed from the lock cylinder. The opening 107 permits rotation of the key 99 from the locked condition of the lock cylinder 59 for less than 90°, which is sufficient to unlock the lock cylinder 59 and rotate the cam actuator 63 to position its camming surfaces 103,104 opposite holes 100,101, but not sufficient to permit the key 99 to be withdrawn from the lock cylinder 59. Thus, a positive indication of whether the security device 20 is locked is provided by the presence or absence of the key 99 in the locking device 55. In addition, providing a limited opening to the lock cylinder 59 limits access to the lock cylinder, which hinders tampering with the lock cylinder.

Referring to FIGS. 6 and 7, to unlock the security device 20 and remove it from the king pin 22, the key 99 is inserted through the opening 107 into the lock cylinder entrance 109 and rotated approximately 90° to rotate the cam actuator 63 to the position shown in FIG. 6 in which the cam surfaces 103 and 104 are adjacent the openings 100,101 of the locking bar 57. Clearance is thereby provided for the bearing balls 65 to move into the locking bar 57 and permit movement of the locking bar 57 outwardly so the holes 100,101 of the locking bar 57 move past the shoulder 90 in the hole 42. The shoulder 90 is inclined and acts as a camming surface for the bearing balls 65 to cam them into the holes 100,101 when the locking bar 55 is retracted outwardly by means of the key 99.

As described above, the locking bar 57 includes opposed ends 105 and 67, end 105 having a limited opening 107 through which the lock cylinder 59 cannot pass and end 67 closed by the removable closure 66. The flanges 68 of the closure 66 can only be inserted into and removed from the recess 69 by radial movement of the closure 66 relative to the axis of the cylindrical locking bar 57, which can only be done when the security device 20 is not mounted to a king pin 22. Thus, the lock cylinder 59 cannot be removed from either end of the locking bar 57 when the security device 20 is mounted to the king pin 22. The thickness of the flange 68 of the end closure 66 and the thickness of the recess 69 in end 67 of the locking bar 57 are substantial so that it is exceedingly difficult to punch the closure 66 axially out of the locking bar 57. Moreover, since in the mounted and locked position of the locking device 20 (FIG. 5), the end closure 66 of the locking bar 55 is butted up against the reduced diameter portion 28 of the key pin 22, it is virtually impossible to punch out the end closure 66.

Referring to FIGS. 8 and 9, the locking device 55 includes a standard lock cylinder such as standard lock cylinder 59 or 120. In order to accomodate different standard lock cylinders in the locking bar 57, the interior of the locking bar is generally elliptically shaped and receives a generally elliptically shaped sleeve 61 (for cylinder 59) and 130 (for cylinder 120). The interiors of the sleeves 61,130 are configured to receive a specific standard lock cylinder. The standard lock cylinder 120 includes a rotatable cylinder plug poriton 132 to which is connected a bar 134, and a camming actuator 63a is configured to be connected to this bar 134.

Although the security device 20 may be constructed of different materials and have different configurations and dimensions, a preferred material for the locking bar 57 is 302 stainless steel which has over one hundred thousand PSI strength, and is highly resistant to torching and to drilling. The body of the security device is also made of a strong material which resists torching, drilling and fracturing. A preferred exterior diameter of the locking bar is 1⅜ inches, and as described above, the locking bar 57 is locked in position by hardened steel bearing balls which resist fracturing. Thus, the locking bar 57 operates as a deadbolt of substantial size as opposed to a spring-loaded latch.

Certain changes and modifications to the embodiments of the invention disclosed herein and uses thereof will be readily apparent to those skilled in the art. It is the applicant's intention to cover by the claims all such uses of the invention and all those changes and modifications which could be made to the embodiments of the invention herein chosen for the purpose of disclosure without departing from the spirit and scope of the invention.

What is claimed is:

1. A security device lockable to a vehicle coupling pin for preventing unauthorized use of the vehicle to which the coupling pin is attached, the security device comprising a body having a cavity therein configured to receive a coupling pin, a first hole in the body communicating with the cavity and with the exterior of the body, and a locking device comprising an enclosure which is slidably disposed in the first hole, the enclosure having a first opening at one end which faces the exterior of the body and a second opening at an opposite end which faces the cavity, a key actuable lock cylinder having a locked condition and an unlocked condition disposed in the enclosure, the lock cylinder having an entrance at an end thereof facing the exterior of the body for receiving a key by means of which the lock cylinder is actuable to its locked and unlocked conditions, the one end of the enclosure substantially covering the key entrance end of the lock cylinder and the first opening permitting passage of a key therethrough and rotation of a key therein, the lock cylinder and the first and second openings to the enclosure being sized and configured so that the lock cylinder is selectively removable from the enclosure only through its second opening, the security device including means for selectively preventing removal of the enclosure from the first hole and means actuable by the lock cylinder for causing engagement between the locking device enclosure and the body to prevent movement between the enclosure and the body in the locked condition of the lock cylinder and permitting movement between the enclosure and the body in the unlocked condition of the lock cylinder, the enclosure or means attached thereto or forming part thereof engaging a coupling pin disposed in the cavity when the lock cylinder is in its locked condition.

2. The security device according to claim 1 wherein the first opening to the enclosure is configured so as to permit limited rotation of a key inserted therethrough into the lock cylinder, the lock cylinder being constructed so as to be actuated to its locked and unlocked conditions by the limited rotation of the key, and the lock cylinder being further constructed so as to prevent withdrawal of the key therefrom in the unlocked condition thereof within the limited rotation permitted for the key.

3. The security device according to claim 2 wherein the first opening to the enclosure is configured to permit rotation of a key inserted therein approximately 90°.

4. The security device according to claim 1 wherein the means actuable by the lock cylinder includes first means coupled to the lock cylinder for movement between locking and unlocking positions thereof respectively corresponding to the locked and unlocked conditions of the lock cylinder in response to actuation of the lock cylinder to its locked and unlocked conditions and second means coupled to the first means for causing engagement between the locking device enclosure and the body in the locking position of the first means, and wherein the enclosure is slidably mounted in the first hole of the body for movement between locking and unlocking positions thereof, the enclosure in its locking position engaging the coupling pin disposed in the cavity and being locked thereat when the lock cylinder is in its locked condition, the enclosure being movable to its unlocking position in which the body may be separated from the coupling pin when the lock cylinder is in its unlocked condition.

5. The security device according to claim 4 wherein the means actuable by the lock cylinder includes at least one hole in the enclosure and the first means comprises at least one bearing ball disposed to be moved in the hole to substantially project from the enclosure in the locking position of the enclosure when the lock cylinder is in its locked condition, and to be substantially within the enclosure in the unlocking position of the enclosure, the first hole in the body including a shoulder which engages the bearing ball when it substantially projects from the enclosure whereby the enclosure is prevented from moving in the first hole in the body to lock the security device to the coupling pin, the bearing ball permitting the enclosure to be moved in the first hole in the body between the locking and unlocking positions thereof when the bearing ball is substantially within the enclosure in the unlocked condition of the lock cylinder.

6. The security device according to claim 1 wherein the means preventing removal of the enclosure from the first hole in the body comprises a second hole in the body communicating with the first hole and a fastener disposed in the second hole extending into the first hole, the enclosure including means engagable by the fastener and the fastener being movable into and out of engagement with the engaging means.

7. The security device according to claim 1 wherein the enclosure includes a removable closure for its second end and means cooperating with the removable closure to receive it and close the enclosure second end to prevent removal of the lock cylinder therefrom, the receiving means being located and the closure being configured so that the closure may be removed only in the unlocked condition of the lock cylinder when the coupling pin is not disposed in the cavity.

8. The security device according to claim 1 including a hollow sleeve removably disposed in the enclosure, the enclosure being configured so that the sleeve is received therein and fixed against rotation relative thereto, the sleeve having an inner configuration for receiving a standard lock cylinder.

9. The security device according to claim 1 wherein the first hole and the enclosure are generally cylindrical.

10. A security device lockable to a vehicle coupling pin for preventing unauthorized use of the vehicle to which the coupling pin is attached, the security device comprising a body having a cavity configured therein to receive a coupling pin, a first hole in the body communicating with the cavity and with the exterior of the body, and a locking device comprising an enclosure which is slidably disposed in the first hole, the enclosure having a cavity, a key actuated lock cylinder having a locked condition and an unlocked condition disposed in the cavity of the enclosure, the enclosure having a first opening thereto in a first end thereof facing the exterior of the body and the lock cylinder having a first end facing the exterior of the body, the first end of the lock cylinder having an entrance thereto for receiving a key therein by means of which the lock cylinder is actuable to its locked and unlocked conditions, the first end of the enclosure being configured to cover a substantial portion of the first end of the lock cylinder and the first opening to the enclosure being configured so as to permit limited rotation of a key inserted therethrough into the lock cylinder, the lock cylinder being constructed so as to be actuated to its locked and unlocked conditions by the limited rotation of the key, and the lock cylinder being further constructed so as to prevent withdrawal of the key therefrom in the unlocked condition thereof within the limited rotation of the key permitted by the enclosure first opening, the enclosure including a removable closure for its second end and means cooperating with the removable closure to receive it and close the enclosure second end to prevent removal of the lock cylinder therefrom, the receiving means being located and the closure being configured so that the closure may be removed only in the unlocked condition of the lock cylinder when the coupling pin is not disposed in the cavity, and means coupled to the lock cylinder and actuable thereby enabling slidable movement of the enclosure in the first hole between a locking position in which the enclosure or means attached thereto or forming part thereof is positioned to engage a coupling pin disposed in the cavity and prevent separation of the body from the coupling pin when the lock cylinder is in its locked condition and an unlocking position in which the enclosure is positioned to permit relative movement of the body and the coupling pin when the lock cylinder is in its unlocked condition.

11. The security device according to claim 10 wherein the first opening to the enclosure is configured to permit rotation of a key inserted therein approximately 90°.

12. The security device according to claim 10 wherein the means actuable by the lock cylinder includes first means coupled to the lock cylinder for movement between locking and unlocking positions thereof respectively corresponding to the locked and unlocked conditions of the lock cylinder in response to actuation of the lock cylinder to its locked and unlocked conditions and second means coupled to the first means for causing engagement between the locking device enclosure and the body in the locking position of the first means, and wherein the enclosure is slidably mounted in the first hole of the body for movement between locking and unlocking positions thereof, the enclosure in its locking position engaging the coupling pin disposed in the cavity and being locked thereat when the lock cylinder is in its locked condition, the enclosure being movable to its unlocking position in which the body may be separated from the coupling pin when the lock cylinder is in its unlocked condition.

13. The security device according to claim 12 wherein the means actuable by the lock cylinder includes at least one hole in the enclosure and the second means comprises at least one bearing ball disposed to be moved in the hole by the first means to substantially project from the enclosure in the locking position of the enclosure when the lock cylinder is in its locked condition, and to be substantially within the enclosure in the unlocking position of the enclosure, the first hole in the body including a shoulder which engages the bearing ball when it substantially projects from the enclosure whereby the enclosure is prevented from moving in the first hole in the body to lock the security device to the coupling pin, the bearing ball permitting the enclosure to be moved in the first hole in the body between the locking and unlocking positions thereof when the bearing ball is substantially within the enclosure in the unlocked condition of the lock cylinder.

14. the security device according to claim 10 including means for preventing removal of the enclosure from the first hole in the body comprising a second hole in the body communicating with the first hole and a fastener disposed in the second hole extending into the first hole, the enclosure including means engagable by the fastener and the fastener being movable into and out of engagement with the engaging means.

15. The security device according to claim 10 including a hollow sleve removably disposed in the enclosure, the enclosure being configured so that the sleeve is received therein and fixed against rotation relative thereto, the sleeve having an inner configuration for receiving the lock cylinder.

16. The security device according to claim 10 wherein the first hole and the enclosure are generally cylindrical.

17. A locking device for a security device lockable to a vehicle coupling pin for preventing unauthorized use of the vehicle to which the coupling pin is attached, the security device comprising a body having a cavity therein configured to receive a coupling pin, a first hole in the body communicating with the cavity and the exterior of the body, and a locking device comprising an enclosure which is slidably disposed in the first hole for movement between a locking position and an unlocking position, the enclosure having a cavity, a key actuated lock cylinder having a locked condition and an unlocked condition disposed in the cavity of the enclosure, the enclosure having a first opening thereto at one end thereof and a second opening thereto at an opposite end thereof, the lock cylinder and the first and second openings being configured so that the lock cylinder is removable from the enclosure only through the second opening, the first opening being sized to permit the key to be passed therethrough into the lock cylinder by means of which the lock cylinder is actuable to its locked and unlocked conditions, a hollow sleeve removably disposed in the enclosure, the enclosure being configured so that the sleeve is received therein and fixed against rotation relative thereto, the sleeve having an inner configuration for receiving the lock cylinder, and means coupled to the lock cylinder movable between a locking position substantially protruding from the enclosure in the locked condition of the lock cylinder for engaging the body and thereby locking the enclosure in a locking position thereof, and an unlocking position substantially within the enclosure in the unlocked condition of the lock cylinder permitting slidable movement of the enclosure relative to the body.

18. The security device according to claim 17 wherein the first opening to the enclosure is configured so as to permit limited rotation of a key inserted therethrough into the lock cylinder, the lock cylinder being constructed so as to be actuated to its locked and unlocked conditions by the limited rotation of the key, and the lock cylinder being further constructed so as to prevent withdrawal of the key therefrom in the unlocked condition thereof within the limited rotation permitted for the key.

19. The security device according to claim 18 wherein the first opening to the enclosure is configured to permit rotation of a key inserted therein approximately 90°.

20. The security device according to claim 17 wherein the means coupled to the lock cylinder includes at least one bearing ball and the enclosure includes at least one hole in which the bearing ball is disposed to be moved to substantially project from the hole in the enclosure in the locking position of the enclosure and to be substantially in the hole in the enclosure in the unlocking position of the enclosure, the bearing ball being adapted to engage structure in the security device in the locking position of the enclosure.

21. The security device according to claim 17 wherein the enclosure includes a removable closure for its second end and means cooperating with the removable closure to receive it and close the enclosure second end to prevent removal of the lock cylinder therefrom, the receiving means being located and the closure being configured so that the closure may be removed only transversely relative to the enclosure.

22. The security device according to claim 17 wherein the first hole and the enclosure are generally cylindrical.

* * * * *